(12) United States Patent
Katchmart

(10) Patent No.: US 11,935,561 B1
(45) Date of Patent: *Mar. 19, 2024

(54) DIGITAL TIMING RECOVERY FOR CONSTANT DENSITY SERVO READ OPERATIONS

(71) Applicant: Marvell Asia Pte Ltd, Singapore (SG)

(72) Inventor: Supaket Katchmart, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,585

(22) Filed: Jan. 20, 2023

Related U.S. Application Data

(63) Continuation of application No. 17/659,703, filed on Apr. 19, 2022, now Pat. No. 11,587,588.

(60) Provisional application No. 63/181,800, filed on Apr. 29, 2021.

(51) Int. Cl.
  *G11B 5/09* (2006.01)
  *G11B 20/10* (2006.01)
  *G11B 20/14* (2006.01)

(52) U.S. Cl.
  CPC .................... *G11B 20/14* (2013.01)

(58) Field of Classification Search
  CPC ..... G11B 20/10009; G11B 5/09; G11B 20/19; G11B 20/1419; G11B 20/10212; G11B 5/00; G11B 20/14; G11B 5/59627; G11B 5/59666; G11B 20/1258; G11B 5/59633
  USPC .......................................................... 360/39
  See application file for complete search history.

(56) References Cited

U.S. PATENT DOCUMENTS

| | | | |
|---|---|---|---|
| 8,411,385 B2 | 4/2013 | Annampedu | |
| 8,861,112 B1 * | 10/2014 | Pan | G11B 5/4886 360/39 |
| 10,971,187 B2 | 4/2021 | Katchmart | |

* cited by examiner

*Primary Examiner* — Nabil Z Hindi

(57) ABSTRACT

A method of reading servo wedge data from a rotating constant-density magnetic storage medium having a plurality of tracks, where each track is written at a track pattern frequency, the respective track pattern frequencies varying from a lowest frequency at an innermost one of the tracks to a highest frequency at an outermost one of the tracks, includes, for each respective track, determining, based on the pattern frequency of the respective track, a desired sampling position, sampling actual samples of servo wedge data based on a sampling clock used for all tracks, having a sampling frequency at least equal to the track pattern frequency of the outermost track, determining a phase relationship of the desired sampling position to the sampling clock, and, depending on the phase relationship between the sampling position and the sampling clock, interpolating a sample, or omitting interpolation of a sample and squelching the interpolation clock.

20 Claims, 6 Drawing Sheets

DIGITAL TIMING RECOVERY FOR CONSTANT DENSITY SERVO READ OPERATIONS

CROSS REFERENCE TO RELATED APPLICATIONS

This is a continuation of copending, commonly-assigned U.S. patent application Ser. No. 17/659,703, filed Apr. 19, 2022 (now U.S. Pat. No. 11,587,588), which claims the benefit of, commonly-assigned U.S. Provisional Patent Application No. 63/181,800, filed Apr. 29, 2021, each of which is hereby incorporated by reference herein in its respective entirety.

FIELD OF USE

This disclosure relates to digital timing recovery for use in constant density servo operations in a hard disk drive. More particularly, this disclosure relates to a hard disk drive employing constant density servo operations based on the frequency of the outermost tracks, and a digital timing recovery technique to interpolate lower frequencies on inner tracks.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

In magnetic recording, as one example, reading and writing are performed by one or more heads that move relative to the surface of a storage medium. Many magnetic disk drives, for example, include a plurality of individual disks, or "platters," which may be two-sided—i.e., each platter can store data on each of its two sides. Therefore, such a disk drive would have at least two heads for each platter. Indeed, for each platter, there is normally at least one write head and at least one separate read head, so that such a disk drive normally has at least four heads per platter.

In a common configuration, all of the heads in a given disk drive are mounted on arms attached to a common actuator that controls the radial position of the heads (an angular, tangential or circumferential component of motion is provided by the rotation of the platters relative to the heads). This is true whether there is one or many platters, and one or multiple heads per platter.

In order to control the radial position selected by the actuator, each surface of each platter has distributed upon it positional information referred to as "servo" data. The servo data are commonly distributed in spaced-apart servo "wedges" (generally spaced equiangularly) on the platter surface. By reading the servo data as each servo wedge passes under the read head, the disk drive controller can determine the precise radial (and angular) position of the head and can feed back that determination to control the position of the read head or the write head, depending on the required operation.

In some disk drives, data is written at a constant frequency—e.g., determined by the disk rotation—regardless of track, which means data is written less densely on tracks near the outer diameter than on tracks near the inner diameter. In other disk drives, zoned writing may be used, where the disk is divided radially into zones. The density at the innermost radius of each zone is about the same, but the density still decreases radially within each zone. More recently, constant-density writing has been developed, which involves writing at different pattern frequencies (baud rates) on different tracks, with the highest pattern frequency (baud rate) at the outermost track and the lowest pattern frequency (baud rate) at the innermost track.

When reading user data from a constant density disk drive, after seeking to a particular track and switching to the correct frequency, the read head stays on or close to that track so no further frequency programming is required. However, when reading servo data, there are frequent sweeps from the inner diameter of a disk to the outer diameter of the disk, resulting in frequent baud rate changes, making it impractical to continually reset the sampling frequency.

SUMMARY

According to implementations of the subject matter of this disclosure, a method of reading servo wedge data from a rotating constant-density magnetic storage medium having a plurality of tracks, where each track is written at a respective track pattern frequency, the respective track pattern frequencies varying from a lowest track pattern frequency at an innermost one of the plurality of tracks to a highest track pattern frequency at an outermost one of the plurality of tracks, includes, for each respective track, determining, based on the respective track pattern frequency of the respective track, a desired sampling position, sampling actual samples of servo wedge data from the respective track based on a sampling clock used for all tracks, the sampling clock having a sampling frequency at least equal to the track pattern frequency of the outermost one of the plurality of tracks, determining a phase relationship of the desired sampling position to the sampling clock, on determining that the desired sampling position bears a first phase relationship to the sampling clock, interpolating an interpolated sample at the desired sampling position from the actual samples of servo wedge data, and allowing an interpolation clock to rise to latch the interpolated sample, and on determining that the desired sampling position bears a second phase relationship to the sampling clock, omitting interpolation of a sample for the desired sampling position, and squelching the interpolation clock.

In a first implementation of such a method, sampling actual samples of servo wedge data from the respective track based on the sampling clock used for all tracks may include sampling actual samples of servo wedge data from the respective track based on the sampling clock having a sampling frequency equal to the track pattern frequency of the outermost one of the plurality of tracks.

In a second implementation of such a method, sampling actual samples of servo wedge data from the respective track based on the sampling clock used for all tracks may include sampling actual samples of servo wedge data from the respective track based on the sampling clock having a sampling frequency greater than the track pattern frequency of the outermost one of the plurality of tracks.

A third implementation of such a method may further include storing the actual samples for at least a number of clock cycles of the sampling clock, the number being determined by a ratio of the sampling frequency to the track pattern frequency of the innermost one of the plurality of tracks.

In a fourth implementation of such a method, determining, based on the respective track pattern frequency of the respective track, the desired sampling position, may include determining a first desired sampling position based on a rising edge of the track pattern frequency, and determining a second desired sampling position based on a falling edge of the track pattern frequency.

In a fifth implementation of such a method, determining the phase relationship of the desired sampling position to the sampling clock may include determining whether the desired sampling position is earlier than or later than an edge of the sampling clock.

According to a first aspect of that fifth implementation, determining that the desired sampling position bears the first phase relationship to the sampling clock may include determining that an edge of the sampling clock occurs later than the desired sampling position.

According to a second aspect of that fifth implementation, determining that the desired sampling position bears the second phase relationship to the sampling clock may include determining that an edge of the sampling clock occurs earlier than the desired sampling position.

In a sixth implementation of such a method, determining the phase relationship of the desired sampling position to the sampling clock may include adding a predetermined number of clock periods to a previous phase relationship of a previous desired sampling position to the sampling clock.

According to a first aspect of that sixth implementation, when the previous phase relationship of the previous desired sampling position to the sampling clock was the first phase relationship, determining the phase relationship of the desired sampling position to the sampling clock may further include subtracting, from the previous phase relationship added to the predetermined number of clock periods, a product of (1) the predetermined number of clock periods and (2) a ratio of (a) the sampling clock frequency to (b) the respective track pattern frequency.

According to implementations of the subject matter of this disclosure, a storage device includes a rotating constant-density storage medium on which constant-density servo data is written, the rotating constant-density magnetic storage medium having a plurality of tracks, wherein each track is written at a respective track pattern frequency, the respective track pattern frequencies varying from a lowest track pattern frequency at an innermost one of the plurality of tracks to a highest track pattern frequency at an outermost one of the plurality of tracks, and circuitry for reading the constant-density servo data. The circuitry includes a detector, and a controller configured to repeat, for each respective track of the constant-density magnetic storage medium, determining, based on the respective track pattern frequency of the respective track, a desired sampling position, causing the detector to sample actual samples of servo wedge data from the respective track based on a sampling clock used for all tracks, the sampling clock having a sampling frequency at least equal to the track pattern frequency of the outermost one of the plurality of tracks, determining a phase relationship of the desired sampling position to the sampling clock, on determining that the desired sampling position bears a first phase relationship to the sampling clock, interpolating an interpolated sample at the desired sampling position from the actual samples of servo wedge data, and allowing an interpolation clock to rise to latch the interpolated sample, and on determining that the desired sampling position bears a second phase relationship to the sampling clock, omitting interpolation of a sample for the desired sampling position, and squelching the interpolation clock.

In a first implementation of such a storage device, the sampling clock may have a sampling frequency equal to the track pattern frequency of the outermost one of the plurality of tracks.

In a second implementation of such a storage device, the sampling clock may have a sampling frequency greater than the track pattern frequency of the outermost one of the plurality of tracks.

A third implementation of such a storage device, may further include buffer memory configured to store the actual samples, the buffer memory having a capacity for storing at least samples generated during a number of clock cycles of the sampling clock, the number being determined by a ratio of the sampling frequency to the track pattern frequency of the innermost one of the plurality of tracks.

In a fourth implementation of such a storage device, the controller may be configured to determine, based on the respective track pattern frequency of the respective track, the desired sampling position, by determining a first desired sampling position based on a rising edge of the track pattern frequency, and determining a second desired sampling position based on a falling edge of the track pattern frequency.

In a fifth implementation of such a storage device, the controller may be configured to determine the phase relationship of the desired sampling position to the sampling clock by determining whether the desired sampling position is earlier than or later than an edge of the sampling clock.

According to a first aspect of that fifth implementation, the controller may be configured to determine that the desired sampling position bears the first phase relationship to the sampling clock by determining that an edge of the sampling clock occurs later than the desired sampling position.

According to a second aspect of that fifth implementation, the controller may be configured to determine that the desired sampling position bears the second phase relationship to the sampling clock by determining that an edge of the sampling clock occurs earlier than the desired sampling position.

In a sixth implementation of such a storage device, the controller may be configured to determine the phase relationship of the desired sampling position to the sampling clock by adding a predetermined number of clock periods to a previous phase relationship of a previous desired sampling position to the sampling clock.

According to a first aspect of that sixth implementation, the controller may be configured to, when the previous phase relationship of the previous desired sampling position to the sampling clock was the first phase relationship, determine the phase relationship of the desired sampling position to the sampling clock by further subtracting, from the previous phase relationship added to the predetermined number of clock periods, a product of (1) the predetermined number of clock periods and (2) a ratio of (a) the sampling clock frequency to (b) the respective track pattern frequency.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
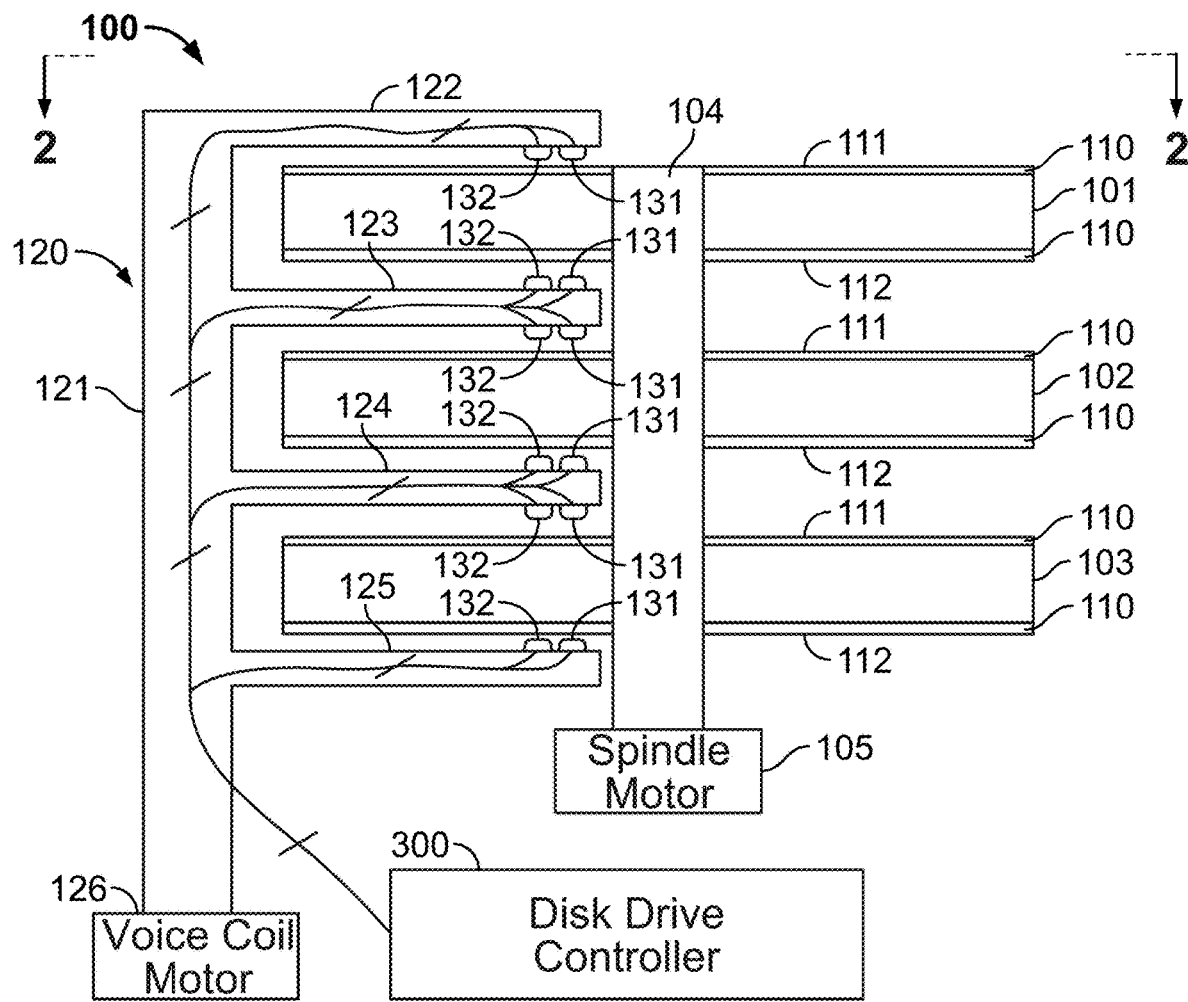
FIGS. 1 and 2 show an example of a disk drive 100 with which the subject matter of the present disclosure may be used.
Figure 2:
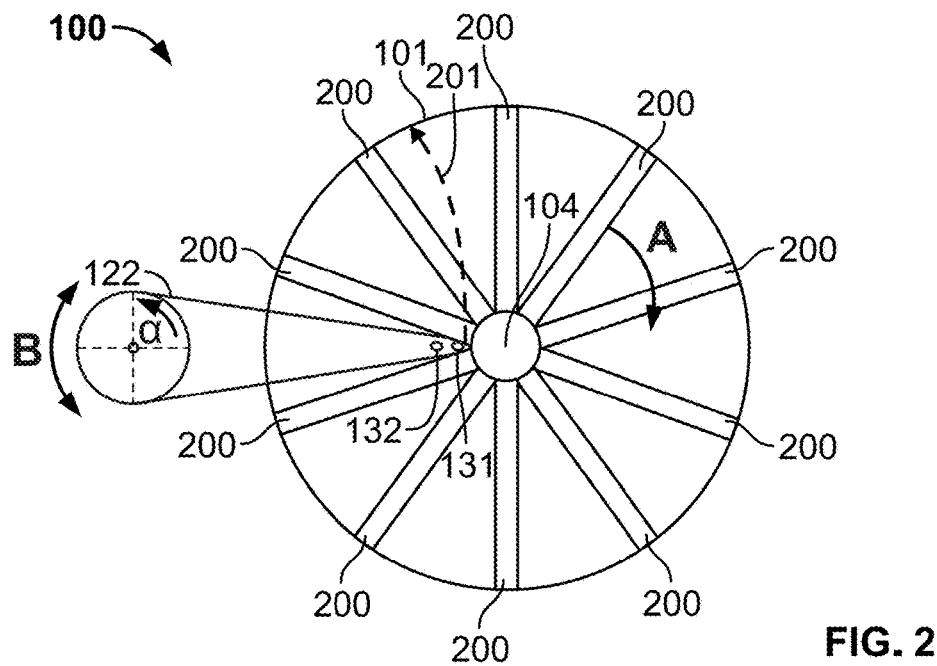

FIGS. 1 and 2 show an example of a disk drive 100 with which the subject matter of the present disclosure may be used. In this particular example, disk drive 100 has three platters 101, 102, 103, although any number of platters may be included in a disk drive with which the subject matter of the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Spindle motor 105 rotates spindle 104 to rotate platters 101-103 in the direction of arrow A (FIG. 2). Although spindle motor 105 is shown connected directly to spindle 104, in some cases spindle motor 105 may be located off-axis of spindle 104 and would be connected to spindle 104 through belts or gears (not shown).

Read/write head assembly 120 includes an actuator 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a plurality of read heads/sensors and write heads. In this case, two sensors 131, 132 are shown, and may represent, respectively, read and write sensors, although it in some applications each arm 123, 124 may bear more than one read head/sensor and more than one write head (not shown). In the configuration shown in FIGS. 1 and 2, arms 122-125 are aligned along a radius of platters 101-103, bringing heads 131, 132 as close as they can get to spindle 104. It should be noted that FIGS. 1 and 2 are schematic only and not to scale. Normally, the spindle diameter would be larger relative to the disk diameter. Moreover, arms 122-125 normally cannot point directly at the center of the disk.

A motor 126, commonly referred to as a "voice-coil motor," rotates actuator 121 back and forth along the directions of arrow B (FIG. 2) to move the heads 131, 132 along the path indicated by dashed arrow 201. The motion of actuator 121 thus changes both the radial and circumferential positions of heads 131, 132, but the circumferential positional change is relatively unimportant insofar as the platters are rotating. The motion of actuator 121 thus is used to control the radial position of heads 131, 132.

The location on surface 111 of platter 101 (the other surfaces are similar) of the aforementioned wedges is shown in FIG. 2. Each servo wedge 200 includes data identifying it by wedge index, track index, or sector number (to give an angular, tangential or circumferential position) and by data representing, at each point along a radius of the platter, the distance from spindle 104. While typical servo wedges are wedge-shaped as the name suggests, in a constant-density system as shown in FIG. 2, servo wedges 200 have the same width at every radius, or more to the point, the same arclength at every track.

Figure 3:
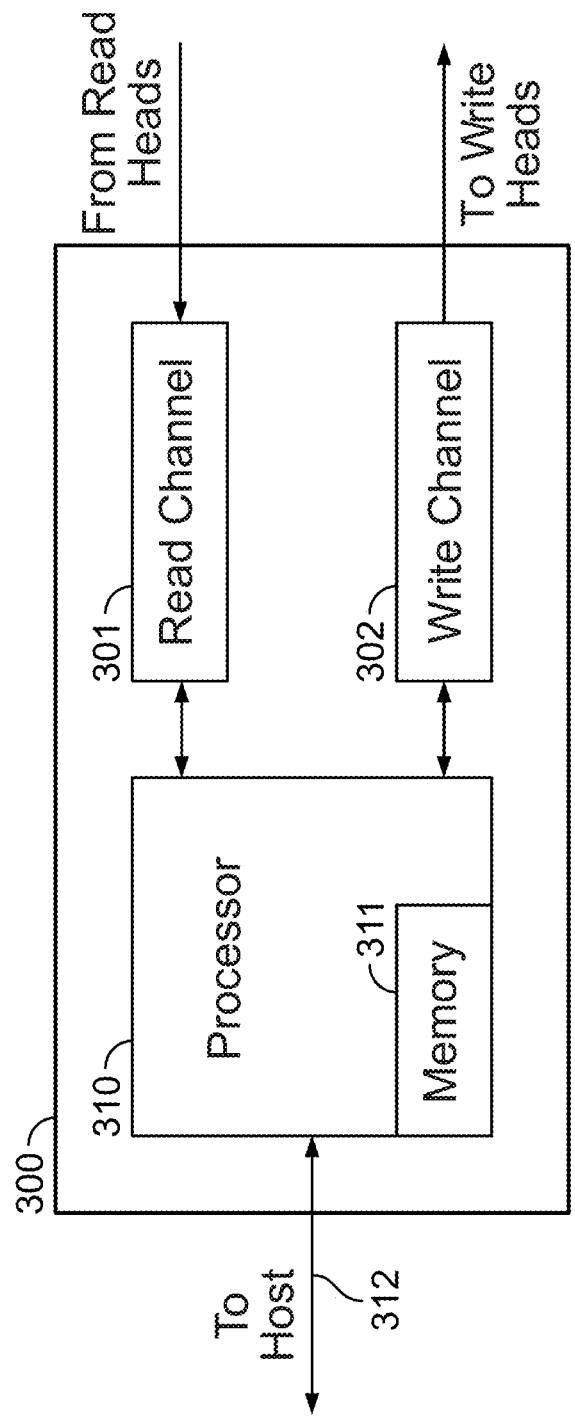
FIG. 3 is a diagram of a hard drive controller that may be used in a disk drive as in FIGS. 1 and 2 in implementations of the subject matter of this disclosure.

Each of read heads 131, 132 is connected to a read channel 301 of a hard drive controller 300 (there is a corresponding write channel 302) (FIG. 3). Hard drive controller 300 also includes a processor 310 and memory 311, as well as a connection 312 to a host processor (not shown). A servo control loop in hard drive controller 300 uses position error sensor (PES) data and the servo wedge data to keep the heads 131, 132 on track.

In a non-constant-density implementation, the frequency is the same for each track, based on the angular velocity of the disk drive platter. Thus, there is only one frequency of concern in the system. Similarly, in a zoned-density implementation, there is a different frequency for each zone, but each track within a zone shares the same frequency. On the other hand, in a constant-density implementation, such as that described in U.S. Pat. No. 10,971,187, which is hereby incorporated by reference herein in its entirety, the frequency increases as the radius increases and may be different for every track. Specifically, although the disk drive platter has a single angular velocity, writing occurs at a higher frequency, or baud rate, for tracks closer to the outer diameter, which have a greater circumference than tracks closer to the inner diameter, so that more data is written per unit angle to maintain a constant data density per unit of track length.

Indeed, the writing pattern frequency may be different for every track. In order to support all of the frequencies used to read servo data from the different tracks, a time base equal to or greater than the frequency of the outermost track is used, and that time base is interpolated to derive a respective sampling frequency to read each of the respective tracks. Digital timing recovery techniques may be used for the interpolation operation. However, typical digital timing recovery techniques may not be suitable for the large number of skipped clock edges when downsampling from such high frequencies, which may be more than 200%—e.g., between 2.2× and 2.4×—of the lowest frequency at the inner diameter.

Therefore, in accordance with implementations of the subject matter of this disclosure, a digital timing recovery technique is provided which supports oversampling by 2× or more. The actual samples are taken according to the oversampled clock, but values are interpolated from those samples based on an interpolation clock in which unused edges of the oversampled clock are dropped ("squelched") or skipped. As a result, it may be necessary to interpolate samples that are as old as two half-rate clock cycles times the oversampling ratio. Accordingly, with an oversampling ratio (OSR) over 2, implementations of the subject matter of this disclosure provide a deep interpolation buffer—i.e., a buffer that saves samples for up to five half-rate clock cycles (i.e., ceil(2×OSR) times the half-rate period).

Figure 4:
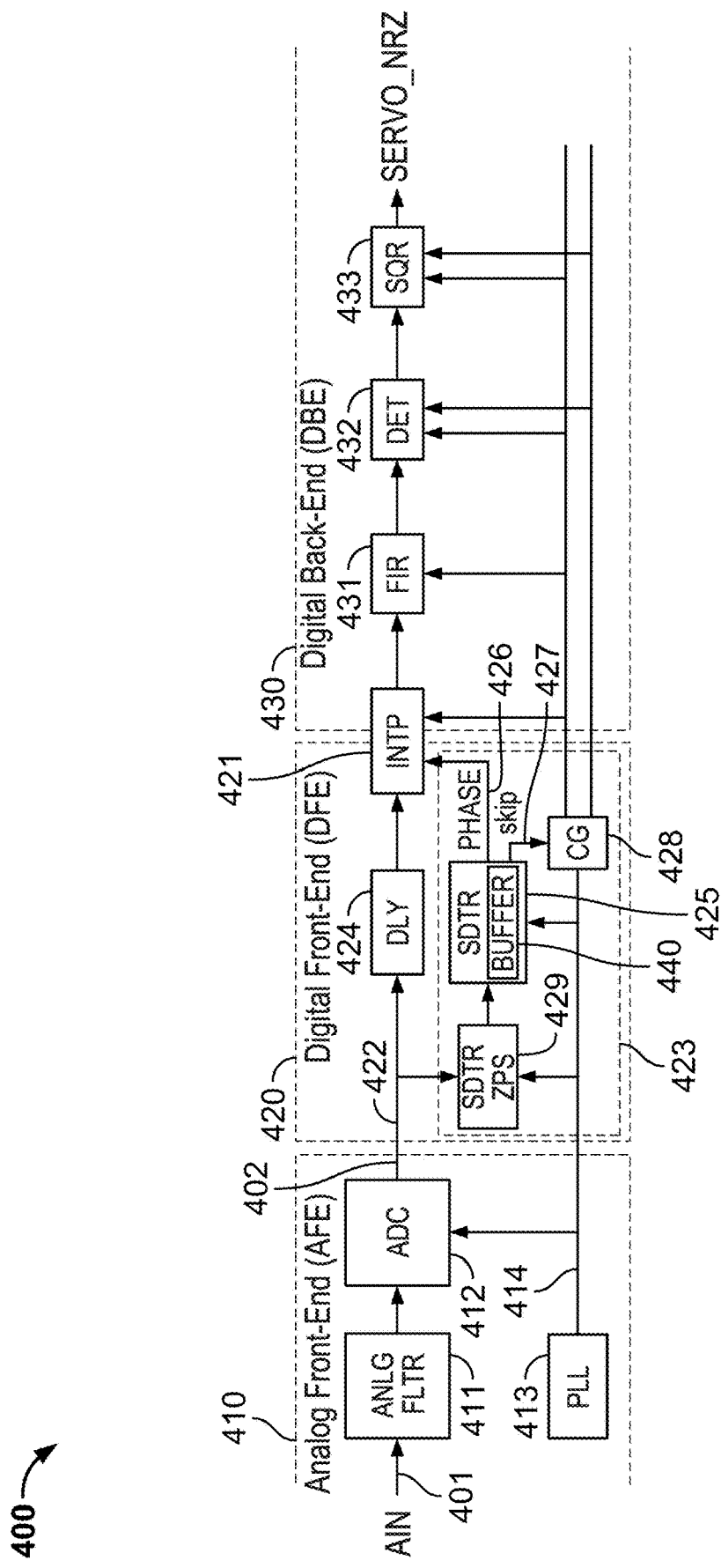
FIG. 4 is a block diagram of circuitry in the hard drive controller of FIG. 3 for implementing digital timing recovery in accordance with implementations of the subject matter of this disclosure.

FIG. 4 is a block diagram of circuitry 400 in read channel 301 in accordance with implementations of the subject matter of this disclosure, including circuitry for implementing digital timing recovery. Circuitry 400 includes an analog front end 410, a digital front end 420, and a digital back end 430. Interpolation circuitry (INTP) 421 straddles the boundary between—i.e., may be considered part of both—digital front end 420 and digital back end 430.

Analog front end 410 includes an analog filter 411 and an analog-to-digital converter (ADC) 412, and also houses system clock source 413, which may be a phase-locked loop (PLL). Output 414 of PLL 413 may be the aforementioned oversampled clock, or may be divided down (by circuitry not shown) to yield the oversampled clock.

Figure 5:
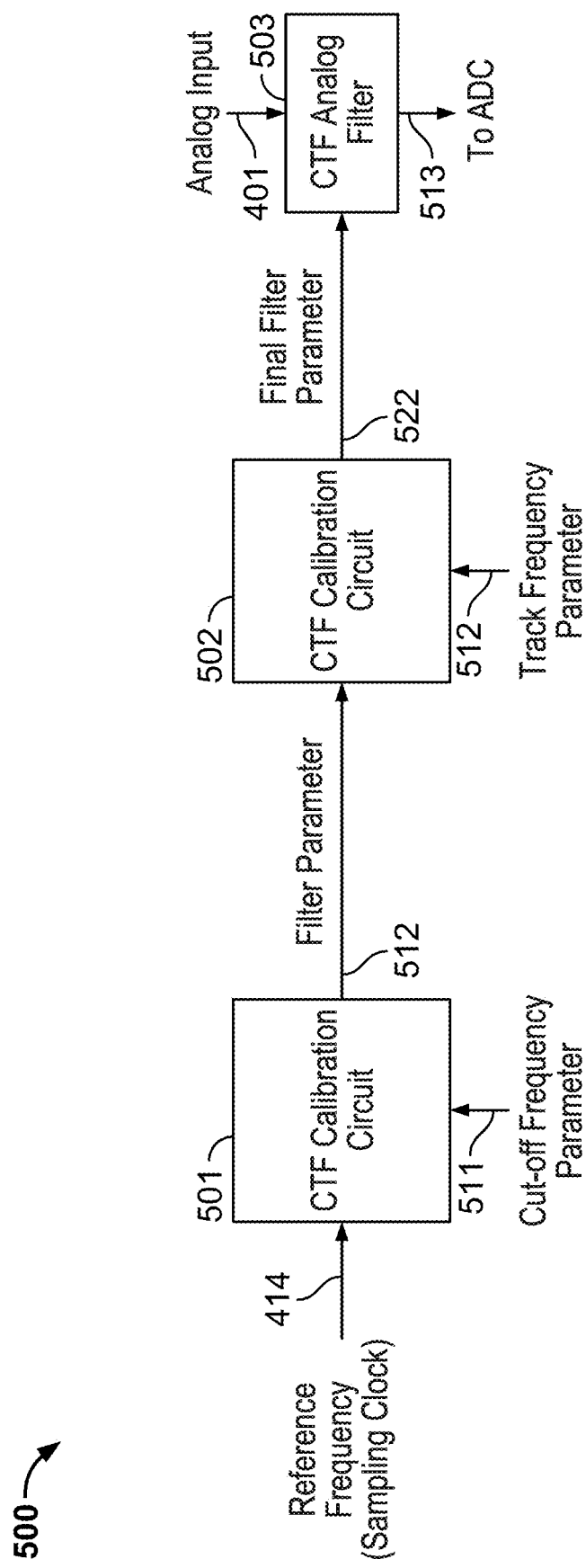
FIG. 5 is a diagram illustrating an implementation of a continuous time filter with adjustable cut-off frequency in accordance with implementations of the subject matter of this disclosure.

Analog filter 411 may include a continuous time filter (CTF), which may function as a bandpass filter with a programmable cut-off frequency. In accordance with implementations of the subject matter of this disclosure, the cut-off frequency may be adjusted for each track as the track frequency changes. An implementation 500 of continuous time filter with adjustable cut-off frequency in accordance with the subject matter of this disclosure is shown in FIG. 5.

The sampling clock 414 is input to an initial CTF calibration circuit 501 along with a parameter 511 the yields a desired cut-off frequency based on sampling clock 414. Output 512 of initial CTF calibration circuit 501 is input to secondary CTF calibration circuit 502 along with a track frequency parameter 513 which may be the ratio of the track frequency to the sample frequency, to yield a final CTF filter parameter 522 which sets the desired cut-off frequency of analog CTF filter 503, which receives analog input 401 (see FIG. 4) and provides filtered output 514 to ADC 412.

Digital back end 430 may be typical, including finite impulse response (FIR) filter 431, data payload detector (DET) 432, and sequencer (SQR) 433.

Digital front end 420 supports the digital timing recovery technique, with oversampling, that is described above. The output 402 of ADC 412 from analog front end 410 is input to digital front end 420 at 422, and is input to both digital timing recovery path 423 and delay 424. Delay 424 delays signal 402 long enough for digital timing recovery path 423 to perform the digital timing recovery operation, so that parameters are available for interpolation at interpolation circuitry 421.

The digital timing recovery operation is performed in servo digital timing recovery (SDTR) circuitry 425 to generate a phase signal 426 for interpolation circuitry 421, and a "skip" signal 427 for clock generation (CG) circuitry 428 as described below. A Zero Phase Start circuit 429 calculates an initial phase for SDTR circuitry 425 so that an initial sample is taken at the correct point. SDTR circuitry 425 includes the deep interpolation buffer 440 described above.

SDTR circuitry 425 generates the phase signal 426 for interpolation circuitry 421, and the "skip" signal 427 for clock generation (CG) circuitry 428. In one implementation, in a dual-bit (i.e., half-rate) architecture, the phase signal and skip signals are generated in accordance with the following instructions:

@(CLK2) begin
      if(current_phase>=0) then
        skip=False
        isx1=intp(current_phase)
        isx0=intp(current_phase+DTR_CLK_PERIOD)
        next_phase=current_phase−2×DIR_CLK_PE-
          RIOD+2+floop+err_grad×ploop_gain
      else
        skip=True
        isx1,isx0=no change
        next_phase=current_phase+0.2
        current_phase=next_phase
    end
where:
    DTR_CLK_PERIOD is the half-period of a virtual sampling clock 603 (VCLK2; see FIG. 6), which is equal to the product of (a) the half-period of the current clock and (b) the oversampling ratio relative to the current track (however, there is no actual signal VCLK2 in the system);
    isx0 and isx1 are the two interpolated samples of a half-rate implementation, with isx1 being the later of the two samples (the one that is interpolated back from the current clock edge by a smaller phase amount (current_phase rather than current_phase+DTR_CLK_PERIOD); and
    floop and err_grad×ploop_gain are error terms that should be close to zero and may be ignored for this discussion.

Generally speaking, in the digital timing recovery operation performed in digital timing recovery path 423, at each rising clock edge of the oversampled clock, an actual sample is taken, but performance of the foregoing instructions examines whether the current amount of accumulated phase error is positive or negative. If the current amount of accumulated phase error is negative, then the next sample to be interpolated is in the future, so no sample is interpolated from the actual samples, and the current edge is skipped by interpolation clock ICLK2 so that latching of a sample value is not performed. The phase is incremented by 2 (i.e., two half-rate clock periods, which is one full-rate clock period) for use in the next iteration. (In a full-rate, single-bit, implementation, the phase would be incremented by 1, less the oversampled clock period, for use in the next iteration.)

If the current amount of accumulated phase error is not negative, then the next sample to be interpolated is now or in the past, and can be interpolated from the current actual sample and the previous actual sample based on the amount of phase error relative to a full clock period. The phase is then incremented by 2, less twice the oversampled clock period, for use in the next iteration. (In a full-rate, single-bit, implementation, the phase would be incremented by 1, less the oversampled clock period, for use in the next iteration.)

Figure 6:
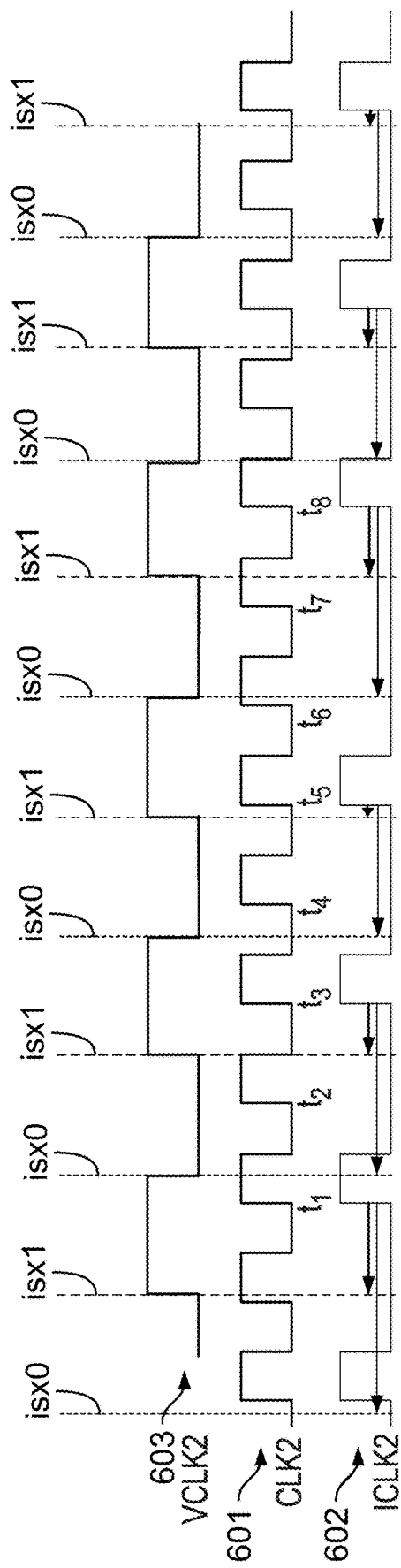
FIG. 6 is a diagram of clock signals in accordance with implementations of the subject matter of this disclosure.

The digital timing recovery operation performed in digital timing recovery path 423 may be understood by reference to the waveforms in FIG. 6, where clock signal (CLK2) 601 is the oversampled clock (e.g., the clock based on the maximum outer-diameter track frequency), while interpolation clock signal (ICLK2) 602 is the lower-frequency clock that controls the latching of the interpolated signals.

In implementations of the subject matter of this disclosure, incoming analog signal (AIN) 401 is sampled on every rising edge of clock 601, and also on every falling edge of clock 601 in a half-rate system. The resulting samples are interpolated to provide samples latched by the lower-frequency clock 602 of a current track inward from the outer edge. As discussed above, on some edges of the faster clock 601, the next sample to be interpolated for the slower clock 602 is in the future, and therefore no sample is interpolated, and the rising edge of the slower clock 602, which would latch the interpolated value, can be skipped. As can be seen, typically every other rising edge of the faster clock 601 is skipped in slower clock 602, but occasionally two rising edges of the faster clock 601 are skipped between edges of the slower clock 602. As a result, the slower clock 602 is irregular.

FIG. 6 further illustrates an example sequence of interpolation and clock skipping in accordance with implementations of the subject matter of this disclosure. As previously noted, this example sequence is a half-rate, or dual-bit (i.e., two samples per clock cycle), implementation. Actual samples are taken at each rising edge of oversampled clock 601, and the desired samples are interpolated at the locations indicated by vertical dashed lines, as described below. T represents the duration of one-half the period of oversampled clock 601—i.e., the duration between a rising edge and an adjacent falling edge, or vice-versa. The samples are identified as isx0 and isx1 as described above.

At rising edge $t_1$ of CLK2, the interpolation sampling point of isx1 is about 1.8T behind time $t_1$. This is the "current_phase" variable discussed above. Because current_phase is positive, meaning the desired sampling point is in the past, rather than the future, one is able to generate samples isx1 and isx0 by interpolation, and ICLK2 is allowed to rise. The "next_phase" may then be calculated as:

next_phase=1.8−2×2.4+2=1.8−4.8+2=−1

At rising edge $t_2$ of CLK2, next_phase becomes the current_phase. Insofar as current_phase is negative (−1), that means that the desired sampling point is in the future, rather than the past, so one is not able to generate samples isx1 and isx0 by interpolation. Because no sample is being generated by interpolation, there is no need for a rising edge of ICLK2 to latch an interpolated sample, so the edge that would correspond to $t_2$ is squelched (i.e., skipped). The "next_phase" may then be calculated as:

next_phase=current_phase+2=−1+2=1

At rising edge $t_3$ of CLK2, next_phase becomes the current_phase. Because current_phase is positive (1), meaning the desired sampling point is in the past, rather than the future, one is able to generate samples isx1 and isx0 by interpolation, and ICLK2 is allowed to rise. The "next_phase" may then be calculated as:

next_phase=1−2×2.4+2=1−4.8+2=−1.8

At rising edge $t_4$ of CLK2, next_phase becomes the current_phase. Insofar as current_phase is negative (−1.8), that means that the desired sampling point is in the future, rather than the past, so one is not able to generate samples isx1 and isx0 by interpolation. Because no sample is being generated by interpolation, there is no need for a rising edge of ICLK2, so the edge that would correspond to $t_4$ is squelched (i.e., skipped). The "next_phase" may then be calculated as:

next_phase=current_phase+2=−1.8+2=0.2

At rising edge $t_5$ of CLK2, next_phase becomes the current_phase. Because current_phase is positive (0.2), meaning the desired sampling point is in the past, rather than the future, one is able to generate samples isx1 and isx0 by interpolation, and ICLK2 is allowed to rise. The "next_phase" may then be calculated as:

next_phase=0.2−2×2.4+2=0.2−4.8+2=−2.6

At rising edge $t_6$ of CLK2, next_phase becomes the current_phase. Insofar as current_phase is negative (−2.6), that means that the desired sampling point is in the future, rather than the past, so one is not able to generate samples isx1 and isx0 by interpolation. Because no sample is being generated by interpolation, there is no need for a rising edge of ICLK2, so the edge that would correspond to $t_6$ is squelched or skipped. The "next_phase" may then be calculated as:

next_phase=current_phase+2=−2.6+2=−0.6

At rising edge $t_7$ of CLK2, next_phase becomes the current_phase. Insofar as current_phase is still negative (−0.6), that means that the desired sampling point is still in the future, rather than the past, so one still is not able to generate samples isx1 and isx0 by interpolation. Because no sample is being generated by interpolation, there again is no need for a rising edge of ICLK2, so the edge that would correspond to $t_7$ is squelched or skipped. The "next_phase" may then be calculated as:

next_phase=current_phase+2=−0.6+2=1.4

At rising edge is of CLK2, next_phase becomes the current_phase. Because current_phase is positive (1.4), meaning the desired sampling point is in the past, rather than the future, one is able to generate samples isx1 and isx0 by interpolation, and ICLK2 is allowed to rise. Although no further clock pulses are labelled in FIG. 5, next_phase for the next clock pulse would be:

next_phase=1.4−2×2.4+2=1.4−4.8+2=−1.4 which means the next pulse of ICLK2 would be squelched or skipped, and the process would continue for future clock pulses.

As seen in FIG. 6, for a 240% oversampling rate, at least every other pulse is skipped, and occasionally two pulses in a row are skipped, necessitating a deep interpolation buffer 440. As noted above, with an oversampling ratio (OSR) over 2, implementations of the subject matter of this disclosure provide a deep interpolation buffer—i.e., a buffer that saves samples for up to five half-rate clock cycles (i.e., ceil(2× OSR) times the half-rate period).

Figure 7:
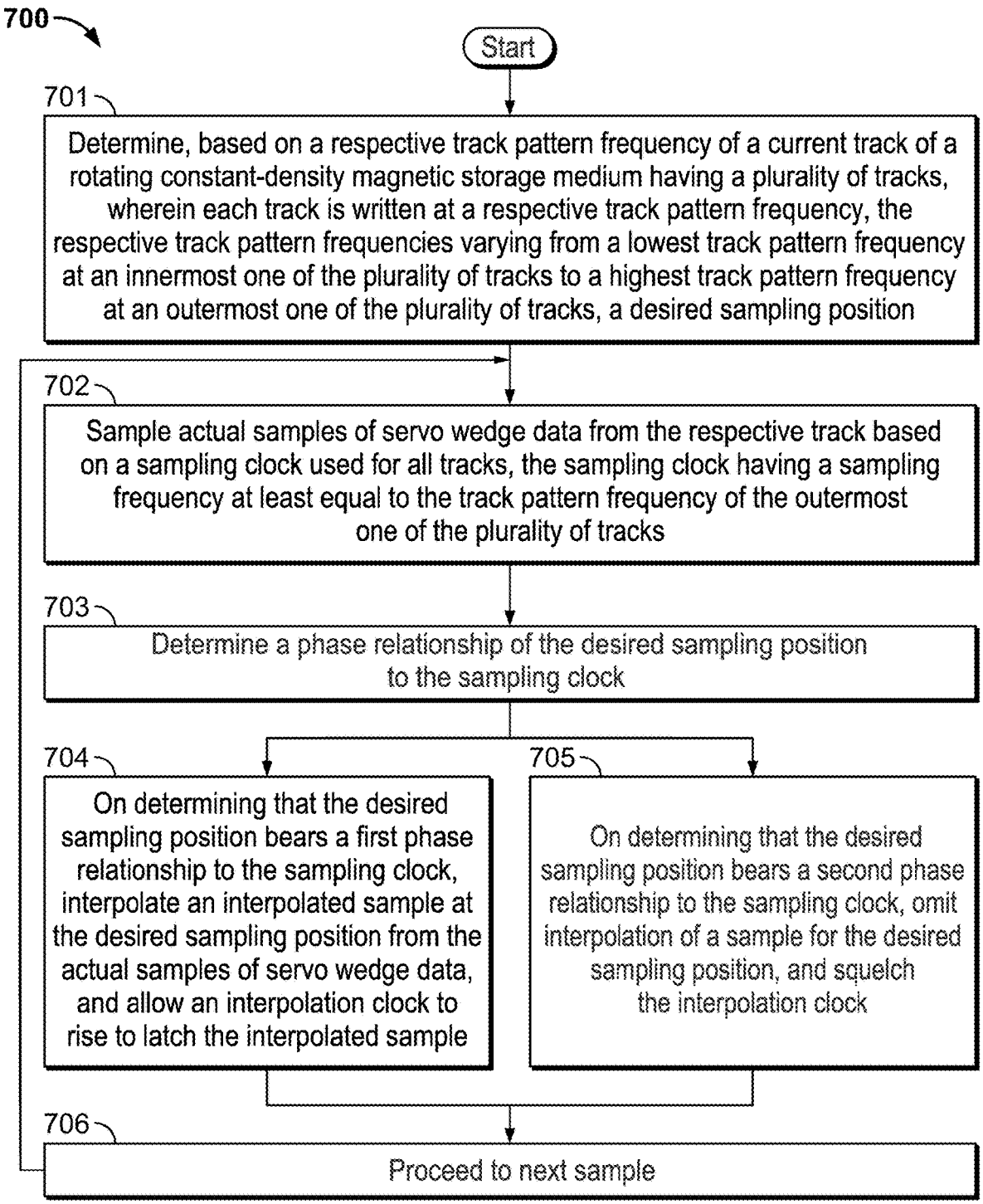
FIG. 7 is a flow diagram illustrating a method in accordance with implementations of the subject matter of this disclosure.

A method 700 according to implementations of the subject matter of this disclosure is diagrammed in FIG. 7. Method 700 begins at 701, where a desired sampling position is determined, based on a respective track pattern frequency of a current track of a rotating constant-density magnetic storage medium having a plurality of tracks, wherein each track is written at a respective track pattern frequency, the respective track pattern frequencies varying from a lowest track pattern frequency at an innermost one of the plurality of tracks to a highest track pattern frequency at an outermost one of the plurality of tracks.

At 702, actual samples of servo wedge data from the respective track are sampled based on a sampling clock used for all tracks, the sampling clock having a sampling frequency at least equal to the track pattern frequency of the outermost one of the plurality of tracks. At 703, a phase relationship of the desired sampling position to the sampling clock is determined.

At 705, on determining that the desired sampling position bears a first phase relationship to the sampling clock, a sample is interpolated at the desired sampling position from the actual samples of servo wedge data, and an interpolation clock is allowed to rise to latch the interpolated sample. Alternatively, at 706, on determining that the desired sampling position bears a second phase relationship to the sampling clock, interpolation of a sample for the desired sampling position is omitted, and the interpolation clock is squelched.

At 707, flow proceeds to the next sample and returns to 702.

Thus it is seen that a digital timing recovery technique that supports downsampling from high frequencies corresponding to an outermost disk track, which may be more than 200%—e.g., between 2.2× and 2.4×—of the lowest frequency at the innermost track, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of reading servo wedge data from a rotating constant-density magnetic storage medium having a plurality of tracks, wherein each track is written at a respective track pattern frequency, the respective track pattern frequencies varying from a lowest track pattern frequency at an innermost one of the plurality of tracks to a highest track pattern frequency at an outermost one of the plurality of tracks, the method comprising:
   for each respective track:
   determining, based on the respective track pattern frequency of the respective track, a desired sampling position;
   sampling actual samples of servo wedge data from the respective track based on a sampling clock used for all tracks, the sampling clock having a sampling frequency at least equal to the track pattern frequency of the outermost one of the plurality of tracks;
   determining a phase relationship of the desired sampling position to the sampling clock;
   on determining that the desired sampling position bears a first phase relationship to the sampling clock:
      interpolating an interpolated sample at the desired sampling position based on an interpolation clock; and
   on determining that the desired sampling position bears a second phase relationship to the sampling clock:
      omitting interpolation, and
      squelching the interpolation clock.

2. The method of claim 1 wherein sampling actual samples of servo wedge data from the respective track based on the sampling clock used for all tracks comprises sampling actual samples of servo wedge data from the respective track based on the sampling clock having a sampling frequency equal to the track pattern frequency of the outermost one of the plurality of tracks.

3. The method of claim 1 wherein sampling actual samples of servo wedge data from the respective track based on the sampling clock used for all tracks comprises sampling actual samples of servo wedge data from the respective track based on the sampling clock having a sampling frequency greater than the track pattern frequency of the outermost one of the plurality of tracks.

4. The method of claim 1 further comprising storing the actual samples for at least a number of clock cycles of the sampling clock, the number being determined by a ratio of the sampling frequency to the track pattern frequency of the innermost one of the plurality of tracks.

5. The method of claim 1 wherein determining, based on the respective track pattern frequency of the respective track, the desired sampling position, comprises:
   determining a first desired sampling position based on a rising edge of the track pattern frequency; and
   determining a second desired sampling position based on a falling edge of the track pattern frequency.

6. The method of claim 1 wherein determining the phase relationship of the desired sampling position to the sampling clock comprises determining whether the desired sampling position is earlier than or later than an edge of the sampling clock.

7. The method of claim 6 wherein determining that the desired sampling position bears the first phase relationship to the sampling clock comprises determining that an edge of the sampling clock occurs later than the desired sampling position.

8. The method of claim 6 wherein determining that the desired sampling position bears the second phase relationship to the sampling clock comprises determining that an edge of the sampling clock occurs earlier than the desired sampling position.

9. The method of claim 1 wherein determining the phase relationship of the desired sampling position to the sampling clock comprises adding a predetermined number of clock periods to a previous phase relationship of a previous desired sampling position to the sampling clock.

10. The method of claim 9 wherein, when the previous phase relationship of the previous desired sampling position to the sampling clock was the first phase relationship, determining the phase relationship of the desired sampling position to the sampling clock further comprises subtracting, from the previous phase relationship added to the predetermined number of clock periods, a product of (1) the predetermined number of clock periods and (2) a ratio of (a) the sampling clock frequency to (b) the respective track pattern frequency.

11. A storage device, comprising:
   a rotating constant-density storage medium on which constant-density servo data is written, the rotating constant-density magnetic storage medium having a plurality of tracks, wherein each track is written at a respective track pattern frequency, the respective track pattern frequencies varying from a lowest track pattern frequency at an innermost one of the plurality of tracks to a highest track pattern frequency at an outermost one of the plurality of tracks; and
   circuitry for reading the constant-density servo data, the circuitry comprising:
   a detector; and
   a controller configured to repeat, for each respective track of the constant-density magnetic storage medium:
      determining, based on the respective track pattern frequency of the respective track, a desired sampling position;
      causing the detector to sample actual samples of servo wedge data from the respective track based on a sampling clock used for all tracks, the sampling clock having a sampling frequency at least equal to the track pattern frequency of the outermost one of the plurality of tracks;
      determining a phase relationship of the desired sampling position to the sampling clock;
      on determining that the desired sampling position bears a first phase relationship to the sampling clock:
         interpolating an interpolated sample at the desired sampling position based on an interpolation clock; and
      on determining that the desired sampling position bears a second phase relationship to the sampling clock:
      omitting interpolation, and
      squelching the interpolation clock.

12. The storage device of claim 11 wherein the sampling clock has a sampling frequency equal to the track pattern frequency of the outermost one of the plurality of tracks.

13. The storage device of claim 11 wherein the sampling clock has a sampling frequency greater than the track pattern frequency of the outermost one of the plurality of tracks.

14. The storage device of claim 11 further comprising buffer memory configured to store the actual samples, the buffer memory having a capacity for storing at least samples generated during a number of clock cycles of the sampling clock, the number being determined by a ratio of the sampling frequency to the track pattern frequency of the innermost one of the plurality of tracks.

15. The storage device of claim 11 wherein the controller is configured to determine, based on the respective track pattern frequency of the respective track, the desired sampling position, by:
   determining a first desired sampling position based on a rising edge of the track pattern frequency; and
   determining a second desired sampling position based on a falling edge of the track pattern frequency.

16. The storage device of claim 11 wherein the controller is configured to determine the phase relationship of the desired sampling position to the sampling clock by determining whether the desired sampling position is earlier than or later than an edge of the sampling clock.

17. The storage device of claim 16 wherein the controller is configured to determine that the desired sampling position bears the first phase relationship to the sampling clock by determining that an edge of the sampling clock occurs later than the desired sampling position.

18. The storage device of claim 16 wherein the controller is configured to determine that the desired sampling position bears the second phase relationship to the sampling clock by determining that an edge of the sampling clock occurs earlier than the desired sampling position.

19. The storage device of claim 11 wherein the controller is configured to determine the phase relationship of the desired sampling position to the sampling clock by adding a predetermined number of clock periods to a previous phase relationship of a previous desired sampling position to the sampling clock.

20. The storage device of claim 19 wherein the controller is configured to, when the previous phase relationship of the previous desired sampling position to the sampling clock was the first phase relationship, determine the phase relationship of the desired sampling position to the sampling clock by further subtracting, from the previous phase relationship added to the predetermined number of clock periods, a product of (1) the predetermined number of clock periods and (2) a ratio of (a) the sampling clock frequency to (b) the respective track pattern frequency.

* * * * *